United States Patent [19]
Sato et al.

[11] Patent Number: 5,383,507
[45] Date of Patent: Jan. 24, 1995

[54] PNEUMATIC RADIAL TIRES INCLUDING WAVED REINFORCING ELEMENTS BETWEEN BELT AND CARCASS

[75] Inventors: Kiyoshi Sato; Yoshihide Kohno, both of Kodaira, Japan

[73] Assignee: Bridgestone Corporation, Tokyo, Japan

[21] Appl. No.: 873,828

[22] Filed: Apr. 27, 1992

[30] Foreign Application Priority Data

Apr. 27, 1991 [JP] Japan .................... 3-124874

[51] Int. Cl.$^6$ .............. B60C 9/18; B60C 9/20
[52] U.S. Cl. .................... 152/527; 152/526; 152/531; 152/533
[58] Field of Search ............. 152/526–527, 152/531, 533

[56] References Cited

U.S. PATENT DOCUMENTS

| | | |
|---|---|---|
| 3,044,522 | 7/1962 | Drakeford et al. . |
| 3,126,042 | 3/1964 | Cegnar . |
| 3,900,062 | 8/1975 | Neville et al. ............ 152/527 |
| 4,098,315 | 7/1978 | Ferrell et al. ............ 152/531 |
| 5,004,031 | 4/1991 | Kadota et al. . |
| 5,054,532 | 10/1991 | Kohno et al. . |

FOREIGN PATENT DOCUMENTS

| | | |
|---|---|---|
| 0332449 | 9/1989 | European Pat. Off. . |
| 0384558 | 8/1990 | European Pat. Off. . |
| 0388178 | 9/1990 | European Pat. Off. . |
| 0425318 | 5/1991 | European Pat. Off. ........... 152/527 |
| 2350192 | 2/1977 | France . |
| 2561126 | 9/1982 | France ................... 152/527 |
| 815055 | 6/1959 | United Kingdom ........... 152/531 |
| 890502 | 2/1962 | United Kingdom . |

OTHER PUBLICATIONS

European Search Report.

*Primary Examiner*—Michael W. Ball
*Assistant Examiner*—Adrienne Johnstone
*Attorney, Agent, or Firm*—Sughrue, Mion, Zinn, Macpeak & Seas

[57] ABSTRACT

A pneumatic radial tire comprising a toroidal carcass layer having a number of radially extending cords buried therein, a belt layer arranged on a radially outer side of the carcass layer and containing a number of non-stretchable cords inclined to an equatorial plane of the tire, and a reinforcing layer arranged between the carcass layer and the belt layer and containing a number of reinforcing elements. The reinforcing elements extend in parallel to the tire equatorial plane as a whole, and are waved at a substantially equal wavelength. The phase of a plurality of the reinforcing elements among all the reinforcing elements buried in the reinforcing layer is different from that of the remaining reinforcing element or elements.

12 Claims, 5 Drawing Sheets

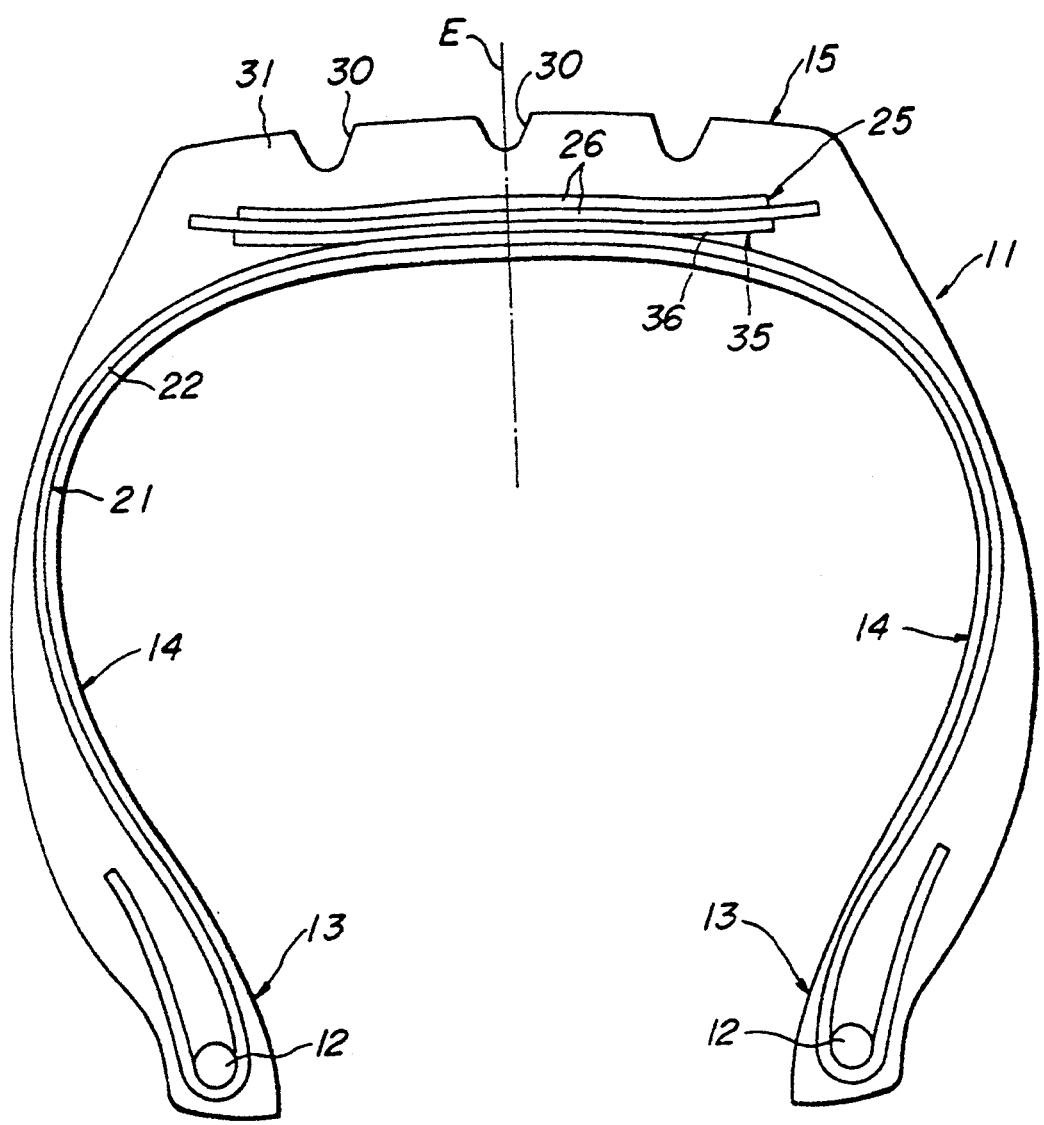
FIG_2a

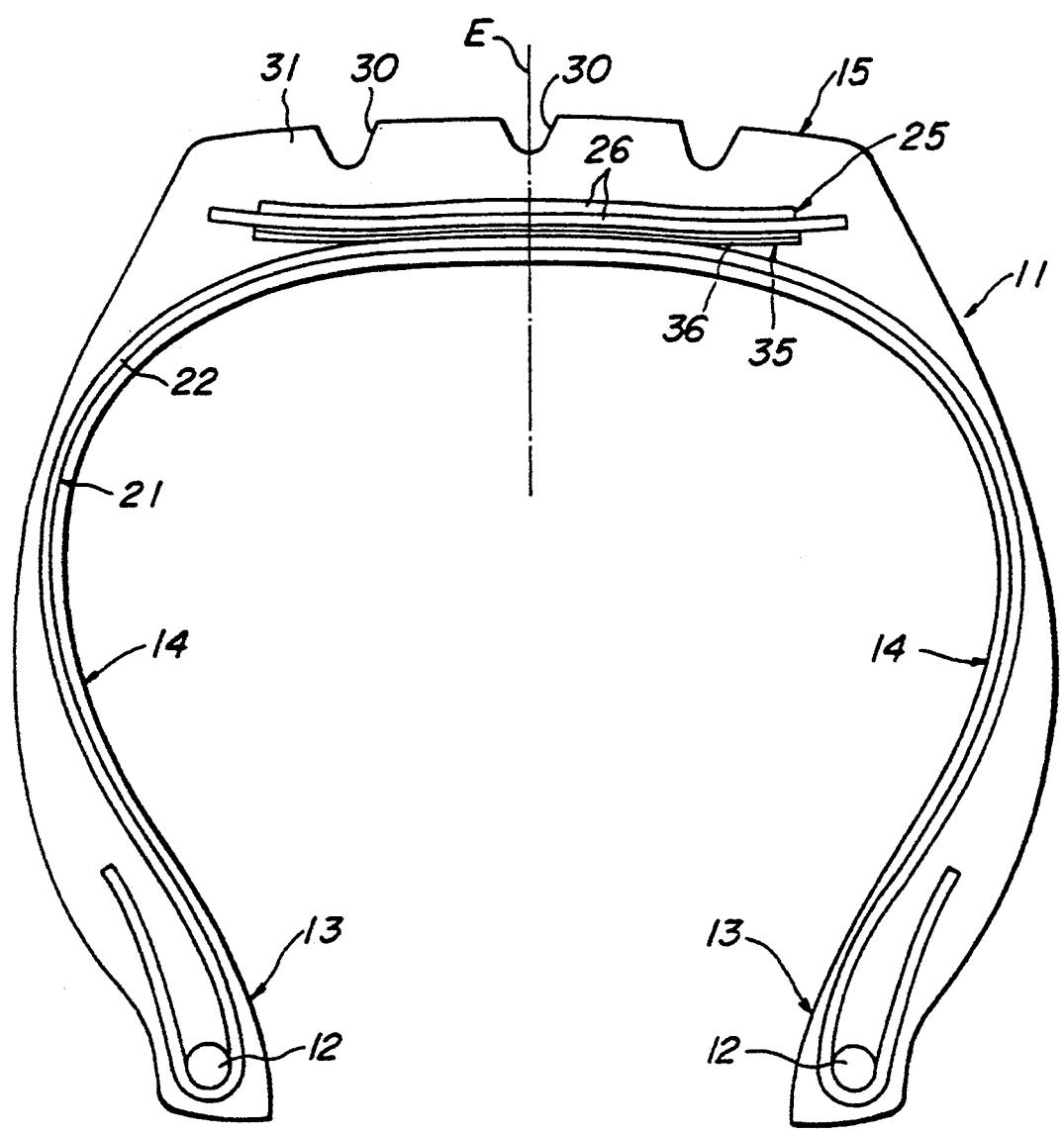
FIG_2b 5,383,507

PNEUMATIC RADIAL TIRES INCLUDING WAVED REINFORCING ELEMENTS BETWEEN BELT AND CARCASS

BACKGROUND OF THE INVENTION

1. Field of the Invention

The present invention relate to pneumatic radial tires having a belt layer and a reinforcing layer radially outwardly arranged around a toroidal carcass layer.

2. Background of the Invention

As conventional pneumatic radial tires, for example, a tire disclosed in Japanese patent application Laid-open No. 1-25,636 is known. This pneumatic radial tire includes a toroidal carcass layer in which a number of cords are radially extended and buried. A belt layer is arranged radially outwardly around the carcass layer and a number of substantially inextensible cords are buried inclinedly with respect to the tire equatorial plane. A reinforcing layer is arranged between the carcass layer and the belt layer, and a number of waved reinforcing elements extend in parallel to a tire equatorial plane as a whole and are buried at the same phase in the reinforcing layer to prevent separation of belt layer.

However, since the tread portion of such a conventional pneumatic radial tire increases its diameter through radially outward growth thereof on inflation with an internal pressure or during running at high speeds, each reinforcing element is stretched in a longitudinal direction (circumferential direction) to decrease its amplitude. Such deformation of each of the reinforcing elements produces meridian forces reversing every half wavelength for each reinforcing element. Since the phase is identical for all the reinforcing elements as mentioned above, great forces are produced through integration of the meridian forces to influence the surrounding carcass. As a result, portions of the carcass layer spaced in the circumferential direction displace alternatively in radially opposite directions, so that circumferentially spaced numerous waves (uneven portions) are formed in the carcass layer. When the carcass layer is waved in this manner, this influences the outer surface of the sidewall portion, so that the sidewall portion is also circumferentially waved to extremely deteriorate the appearance of the tire.

SUMMARY OF THE INVENTION

It is an object of the present invention to provide a pneumatic radial tire which can suppress waving of a carcass layer, and consequently uneven deformation of the outer surface of a sidewall portion.

The above object aimed at by the present invention can be attained by the pneumatic radial tire including a toroidal carcass layer having a number of cords extended and buried in radial directions, a belt layer arranged on a radially outer side of the carcass layer and having a number of nonstretchable cords buried and inclined relative to a equatorial plane of the tire, and a reinforcing layer arranged between the carcass layer and the belt layer and having a number of waved reinforcing elements extended and buried in parallel to the equatorial plane of the tire as a whole and having a substantially equal wavelength, wherein a phase of a plurality of the reinforcing elements among the entire reinforcing elements buried in the reinforcing layer are made different from that of the remaining reinforcing elements.

When the tire is inflated with an internal pressure or is run at high speeds, each reinforcing element is deformed to produce meridian forces reversing alternatively every half wavelength as mentioned above. However, when the phase of a plurality of the reinforcing elements differs from that of the remainder of reinforcing elements, the direction and the magnitude of the forces produced by said plurality of the reinforcing elements differ from those of the remaining reinforcing elements. Consequently, the forces influencing the carcass layer are dispersed in the circumferential direction or offset to one another. Accordingly, the waved amount of the carcass layer is reduced, so that the uneven deformation of the outer surface of the sidewall portion is suppressed.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 2A is a cross sectional view of a tire of the first embodiment of the present invention taken along a meridian line;

FIG. 2B is a cross sectional view of a tire shown in FIG. 1B along a meridian line;

DETAILED DESCRIPTION OF THE INVENTION

The first embodiment of the present invention will be explained in more detail with reference to the drawings.

Figure 1A:
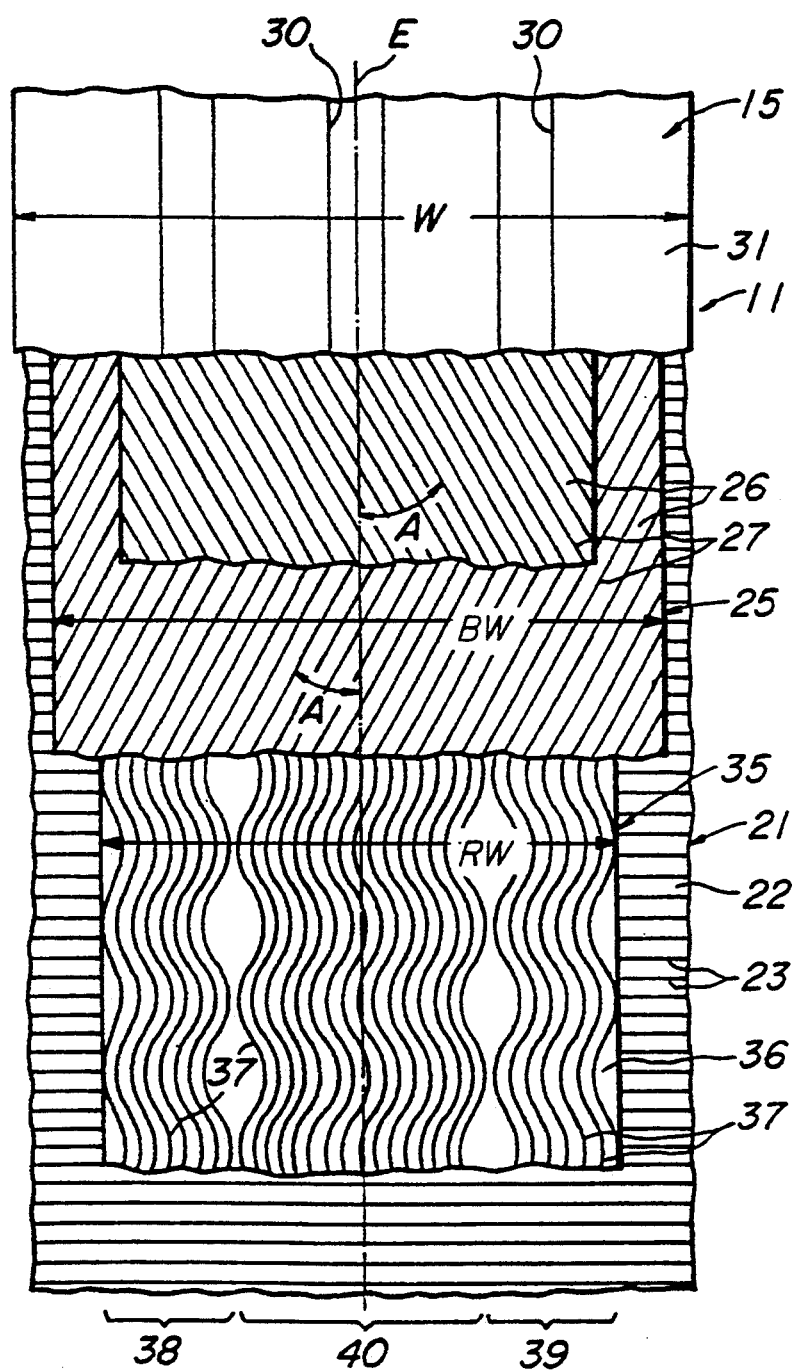
FIG. 1A is a partially broken plan view of a tread portion of a tire according to a first embodiment of the present invention.
Figure 1B:
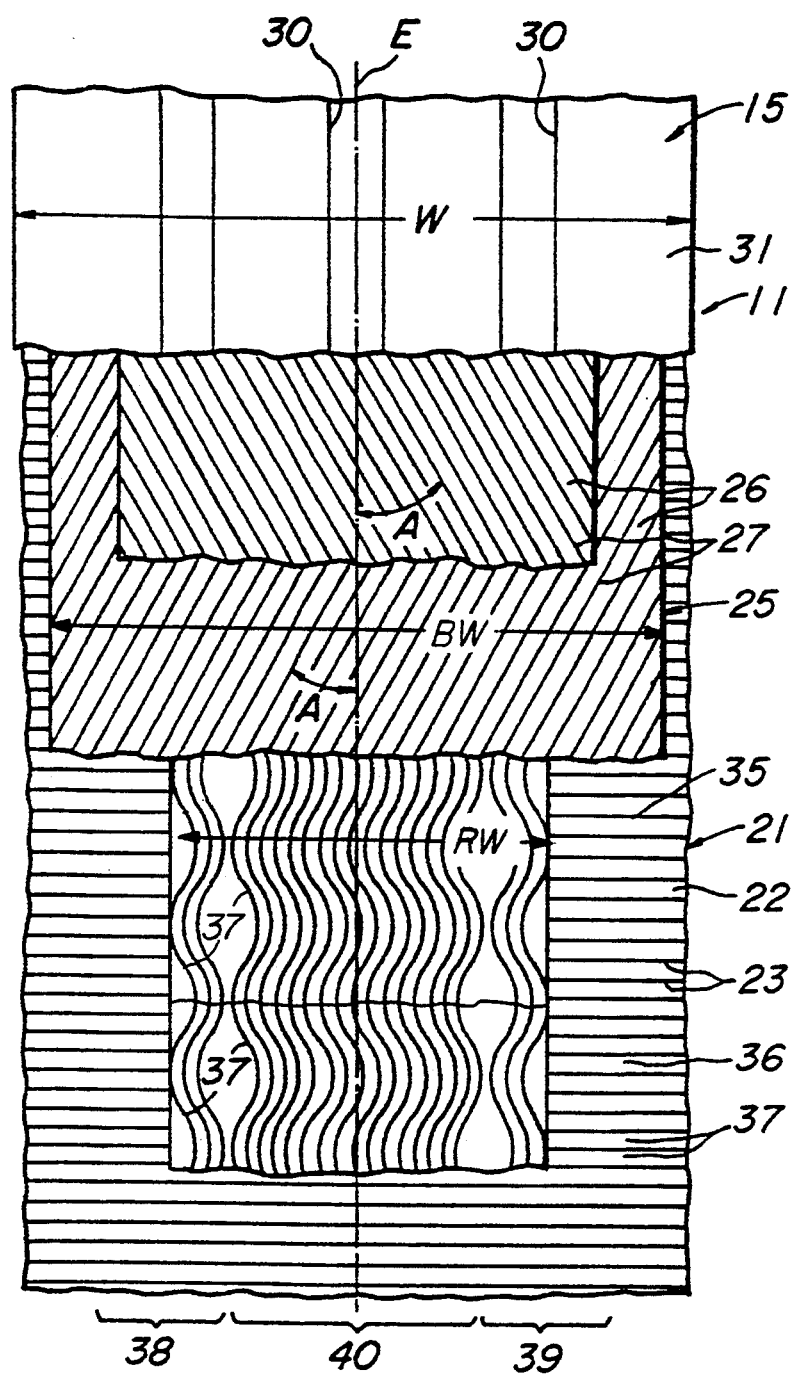
FIG. 1B is a partially broken plan view of a tread portion of a tire according to a modification of FIG. 1A in which the width of a reinforcing ply is reduced.

In FIGS. 1A and 2A, a pneumatic radial tire 11 includes a pair of bead portions 13 in which a bead 12 is buried, sidewall portions 14 extending substantially radially outwardly from these bead portions 13, respectively, and a substantially cylindrical tread portion 15 connecting radially outer ends of the sidewall portions 14. The tire 11 is reinforced with a toroidal carcass layer 21 extending from one bead portion 13 to the other. Each of widthwise opposite ends of the carcass layer 21 is axially outwardly turned up around the bead 12 from the axially inner side. The carcass layer 21 is constituted by at least one carcass ply (one carcass ply 22 in this embodiment). A number of steel cords 23 are buried in each carcass ply 22 such that the steel cords are orthogonal to the equatorial plane E of the tire or extended radially. A belt layer 25, which has a width BW equal to or slightly smaller than the width W of the tread, is arranged on a radially outer side of the carcass layer 21. The belt layer is constituted by at least one ply (two belt plies 26 combined in this embodiment). A number of cords 27 are buried in the belt ply 26 such that the cords are inclined relative to the tire equatorial plane E at an angle A of 10°–50°. The cords 27 are made of a substantially inextensible material such as steel or Kevlar (aromatic polyamide fibers). When a plurality of the belt plies 26 are used, the cords 27 are crossed between at least two belt plies 25. A tread 31, which has grooves 30 such as main grooves and lateral grooves formed on an outer periphery, is arranged on an radially outer side of the belt layer 25.

Further, a reinforcing layer 35 is arranged between the carcass layer 21 and the belt layer 25. The reinforcing layer 35 is constituted by at least one reinforcing ply (one reinforcing ply 36 in this embodiment). The width RW of each reinforcing ply 36 is equal to or slightly smaller than that of a belt ply 26 having the maximum width. When the former is smaller than the latter, the width of the reinforcing ply is preferably 0.4 to 0.7 time as much as that of the maximum-width belt ply 26 This is illustrated in FIGS. 2A and 2B in which the same numerals as in FIGS. 1A and 2B are employed to designate the same elements of the tire. In FIGS. 1A, 1B, 2A and 2B a number of reinforcing elements 37 are buried in each reinforcing ply 36 such that the reinforcing elements 37 extend in parallel to the tire equatorial plane E as a whole. These reinforcing elements 37 are constituted by cords, which are formed by twisting plural filaments, or relatively thick mono-filaments. The reinforcing element 37 may be spirally wound at a number of turns. In this case, each turn corresponds to a single reinforcing element. The reinforcing element is made of a substantially inextensible material such as steel or Kevlar (aromatic polyamide fibers), and is waved within a plane in parallel to opposite surfaces of the reinforcing ply 36, for example, in the form of sinusoidal waves, rectangular waves or triangular waves, at a substantially equal wavelength. In order to facilitate understanding, the amplitude of the waves of the reinforcing element 37 is exaggerated in FIG. 1. The diameter of the reinforcing element 37 is equal to or smaller than that of the cord 27 buried in the belt ply 26. When a plurality of the reinforcing plies 26 are employed, the diameter of the reinforcing element 37 is preferably smaller than that of the cord 27. As a rubber for coating the reinforcing elements 37, a relatively hard rubber having hardness substantially equal to that of rubber used for carcass layer 21 or the belt layer 25 or a soft rubber having hardness lower than that of the rubber used for the carcass layer or the belt layer is used. The number of the reinforcing elements 37 buried per unit width may be determined depending upon the purpose.

The reinforcing ply 36 is divided into end zones 38 and 39 located on widthwise opposite end portions and a central zone 40 located in a widthwise central portion. The phase of a plurality of the reinforcing elements 37 buried in the end zones 38 and 39 is made different from that of the reinforcing elements 37 in the central zone 40. In this embodiment, the phase is deviated (advanced or delayed) by 180° in the circumferential direction between the end zone and the central zone. As mentioned above, when the thus constructed tire 11 is inflated with an internal pressure or run at high speeds, each reinforcing element 37 is deformed to produce radial forces reversing alternatively every half wavelength. However, since the reinforcing elements are arranged as mentioned above, the forces of the reinforcing elements 37 generated in the end zones 38 and 39 differ from those of the reinforcing elements 37 in the central zone 40 with respect to the direction and the magnitude. As a result, the forces influencing the carcass layer 21 are dispersed or offset in the circumferential direction, so that the waved amount of the carcass layer 21 is reduced to suppress uneven deformation of the outer surface of the sidewall portions 14.

It may be considered that the reinforcing layer 35 is constituted by piling two reinforcing plies 36 such that the reinforcing elements 37 in one ply are deviated in phase from those in the other ply. However, even in this case, when the tread portion 15 radially outwardly swells to increase the diameter upon application of the internal pressure or during running at high speeds, the reinforcing elements 37 are always stretched in the circumferential direction and deformed to decrease the amplitude. As a result, rubber between the reinforcing plies 36 is shear deformed. In this time, since shearing forces generated in the rubber between the plies 36 are far smaller than meridian forces generated by the above-mentioned deformation of the reinforcing elements 37, the deformation to decrease the amplitude does not differ even if two reinforcing plies 36 are plied one upon another such that the phase is deviated as mentioned above. Therefore, in order to reduce waving of the carcass layer 21 always occurring due to the deformation of the reinforcing elements 37 resulting from the increase in diameter of the tire, it is important that when a plurality of the reinforcing plies are used, the phase of the reinforcing elements 37 in at least the radially innermost reinforcing ply 36 influencing the carcass layer 21 is varied within the ply.

Figure 3:
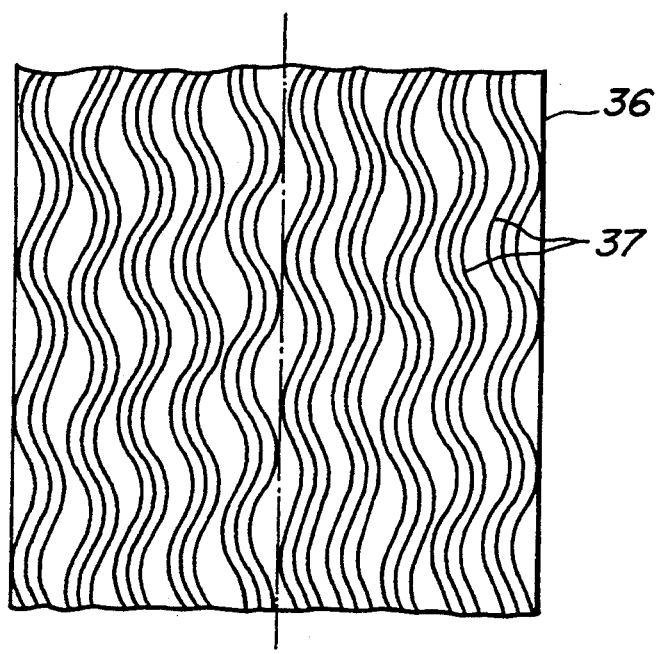
FIG. 3 is a plan view of a reinforcing ply showing another embodiment of the present invention.

In the above embodiment, the reinforcing ply 36 is divided into three zones in the width direction. However, according to the present invention, the reinforcing ply 36 is divided into two zones or four or more zones in the width direction, and the phase of the reinforcing elements in at least one zone is made different from that of the reinforcing elements in the remaining zone or zones. Such a case is illustrated in FIG. 3. In this embodiment, a reinforcing ply 36 is divided into a number of zones, in which the phase of reinforcing elements 37 in a certain zone is made different from that of the reinforcing elements 37 in any of the other zones and the phase of the reinforcing elements 37 in each zone is completely set irregular. When the reinforcing ply 36 is divided into a plurality of the zones and the phase of the reinforcing elements 37 in each zone is made different from that of the reinforcing elements 37 in any of the remaining zone or zones in this manner, the zone maximum width among these zones (if plural zones have the same phase, the maximum width is considered with respect to the total width of the these zones) is preferably not more than 0.7 times as much as that of the reinforcing ply 36. As is understood from test examples mentioned later, the reason is that if the maximum width is more than 0.7 time that of the reinforcing ply 36, visually visible uneven deformation occurs on the outer surface of the sidewall portion 14. Further, it is preferable that the phase of the reinforcing elements 37 in a certain zone, for example, the end zone 38 or 39 differs from that of the reinforcing elements in other zone, for example, the central zone 40 by not less than 90° that is the former is advanced or delayed from the latter by not less than 90°. The reason is that when the difference in phase is not less than 90°, forces produced by the reinforcing elements in a certain zone are reversed and more effectively offset to those produced by the reinforcing elements in other zone, so that the waved amount of the carcass layer 21 can be assuredly reduced.

The reinforcing ply 36 may be formed by a plurality of zones each formed through winding a wide band-shaped member having a number of reinforcing elements 37 buried therein at the substantially same phase around a forming drum by one turn and joining circumferentially opposite ends of the band-shaped member so that the phase of the reinforcing element in at least one zone may differ from that in the remaining zone or zones. Alternatively, the reinforcing ply 36 may be formed by spirally winding a ribbon-shaped body, which has one or a small number of waved parallel reinforcing elements 37 rubberized with rubber, around the forming drum. In the latter case, when one circumferential length of the forming drum is not divided by the wavelength of the reinforcing element 37 with a remainder, the above-mentioned phase difference occurs.

In this illustrated embodiment, the tire 11 also has the following function. That is, according to the conventional tire, the rubber between the belt layer 25 and the reinforcing layer 35 is cracked upon receipt of shearing strain owing to forces produced by the reinforcing elements as mentioned above. Thus, the formed crack may extend toward the tire equatorial plane E through between the belt layer 25 and the reinforcing layer 35 with lapse of time. However, since the direction and the magnitude of the forces produced by the reinforcing elements 37 rapidly vary in a boundary between the adjacent zones having different phases of the reinforcing elements, the extension of the crack is prevented by the boundary between these adjacent zones. The reinforcing layer having the phase of the reinforcing elements varied also has another effect to suppress separation between the reinforcing layer and the belt layer. In order to exhibit such a function, when the reinforcing layer 35 is constituted by a plurality of the reinforcing plies 36, the reinforcing ply having the phase of the reinforcing elements varied is preferably arranged on the radially outermost side of the reinforcing layer. Further, it is preferable that the above boundary between adjacent zones is axially spaced from a widthwise end of the reinforcing ply 36 by a distance being not more than about 0.25 time as much as the width of the reinforcing ply 36.

Next, test examples will be explained.

In these test examples, a conventional tire and test tires 1 through 9 were prepared. In the conventional tire, a number of reinforcing elements were buried in a reinforcing ply all at the same phase. In the test tire 1, as shown in FIG. 1, a reinforcing ply was divided into a pair of end zones (the total width of these zones was 0.5 time as much as that of the reinforcing ply) and a central zone, and the phase of reinforcing elements buried in the end zones were made different from that of reinforcing elements in the central zone by 180° in a circumferential direction. In the test tire 2, a reinforcing ply was divided into two zones along an equatorial plane of the tire, and the phase of reinforcing elements buried in one zone was different from that of the reinforcing elements in the other by 180° in the circumferential direction. In the test tire 3, a reinforcing ply was divided into two zones at a location spaced from an end of the ply by 0.6 times as much as the width of the reinforcing ply, and the phase of reinforcing elements buried in one zone was made different from that of the reinforcing elements in the other by 180° in the circumferential direction. In the test tire 4, a reinforcing ply was divided into two zones at a location spaced from an end of the ply by 0.7 times as much as the width of the reinforcing ply, and the phase of reinforcing elements buried in one zone was made different from that of the reinforcing elements in the other by 180° in the circumferential direction. In the test tire 5, a reinforcing ply was divided into two zones at a location spaced from an end of the ply by 0.8 times as much as the width of the reinforcing ply, and the phase of reinforcing elements buried in one zone was made different from that of the reinforcing elements in the other by 180° in the circumferential direction. In the test tire 6, a reinforcing ply was divided into two zones at a location spaced from an end of the ply by 0.7 times as much as the width of the reinforcing ply, and the phase of reinforcing elements buried in one zone was made different from that of the reinforcing elements in the other by 60° in the circumferential direction. In the test tire 7, a reinforcing ply was divided into two zones at a location spaced from an end of the ply by 0.7 times as much as the width of the reinforcing ply, and the phase of reinforcing elements buried in one zone was made different from that of the reinforcing elements in the other by 90° in the circumferential direction. In the test tire 8, a reinforcing ply was divided into two zones at a location spaced from an end of the ply by 0.7 times as much as the width of the reinforcing ply, and the phase of reinforcing elements buried in one zone was made different from that of the reinforcing elements in the other by 120° in the circumferential direction. In the test tire 9, a ribbon-shaped member in which three reinforcing elements were buried was spirally wound to make the phase of the reinforcing elements irregular over the entire area.

Each of the tires had a tire size of 11R22.5, and a belt layer was constituted by two belt plies having a cord construction in which steel cords of $(1\times3)\times0.23+6\times0.35$ were buried at a density of 5.4 cords/cm. On the other hand, each tire had the reinforcing layer constituted by a single reinforcing ply and having the cord construction in which steel cords of $3+9\times0.23$ were buried at a density of 6.4 cords/cm.

Each tire was fitted to a rim of $8.25\times22.5$, and was inflated with an internal pressure of 8.0 kgf/cm$^2$. After the tire was run at 60 km/h on a drum over a distance of 50,000 km under application of a load of 3,000 kg, an uneven deformation (average stepped amount) of a sidewall portion was measured. Results were 0.6 mm (conventional tire), 0.10 mm (test tire 1), 0.10 mm (test tire 2), 0.12 mm (test tire 3), 0.15 mm (test tire 4), 0.35 mm (test tire), 0.40 mm (test tire 6), 0.20 mm (test tire 7), 0.17 mm (test tire 8) and 0.10 mm (test tire 9). Since the average stepped amount being 0.20 mm or less cannot be visually observed, it is preferable to suppress the average stepped amount to 0.20 mm or less. As to each tire, the amplitude and the wavelength of the reinforcing elements were 3.0 mm and 34.0 mm, respectively, in a green tire state, and the reinforcing elements were stretched after vulcanization to give the amplitude and the wavelength being 0.8 mm and 36.8 mm, respectively.

As mentioned above, according to the present invention, waving of the carcass layer and in turn the uneven deformation of the outer surface of the sidewall portion can be prevented.

What is claimed is:

1. A pneumatic radial tire comprising; a toroidal carcass layer having a number of radially extending cords buried therein, a belt layer arranged on a radially outer side of said carcass layer and containing a number of substantially inextensible cords inclined to an equatorial plane of the tire, and a reinforcing layer arranged between said carcass layer and said belt layer and containing a number of reinforcing elements, said reinforcing elements extending in parallel to said tire equatorial plane as a whole and being waved at a substantially equal wavelength, wherein a phase of a plurality of the reinforcing elements among all the reinforcing elements buried in said reinforcing layer is different from that of the remaining reinforcing element or elements in that reinforcing layer, such that forces influencing the carcass layer are dispersed in the circumferential direction or offset to one another such that a waved amount of the carcass is reduced to suppress uneven deformation of the outer surface of sidewall portion.

2. The pneumatic radial tire according to claim 1, wherein a width of the reinforcing layer is equal to or smaller than that of the belt layer.

3. The pneumatic radial tire according to claim 2, wherein the width of the reinforcing ply is 0.4 to 0.7 times as much as that of the belt layer.

4. The pneumatic radial tire according to claim 1, wherein the reinforcing elements are made of a substantially inextensible material.

5. The pneumatic radial tire according to claim 1, wherein each of the reinforcing elements is waved in a plane parallel to front and rear surfaces of the reinforcing layer in the form of sinusoidal waves, rectangular waves or triangular waves at a substantially equal wavelength.

6. The pneumatic radial tire according to claim 1, wherein a diameter of each of the reinforcing elements is equal to or smaller than that of each of the cords buried in the belt layer.

7. The pneumatic radial tire according to claim 1, wherein said reinforcing layer is constituted by a plurality of reinforcing plies, and the phase of the reinforcing elements with respect to at least a radially innermost reinforcing ply is varied within that ply.

8. The pneumatic radial tire according to claim 1, wherein said reinforcing layer is axially divided into a plurality of zones, and the phase of the reinforcing elements in at least one zone is made different from that of the remaining reinforcing zone or zones.

9. The pneumatic radial tire according to claim 1, wherein an axial width of said zone having the reinforcing elements of which the phase is made different from that of the remaining zone or zones is not more than 0.7 times as much as that of the reinforcing layer.

10. The pneumatic radial tire according to claim 8, wherein the phase of the reinforcing elements in at least one zone is deviated from that of the remaining zone or zones by not less than 90° in a circumferential direction of the tire.

11. The pneumatic radial tire according to claim 7, wherein said reinforcing layer is constituted by a plurality of reinforcing plies, and the phase of the reinforcing elements with respect to at least a radially outermost reinforcing ply is varied within that ply.

12. The pneumatic radial tire according to Claim 11, wherein a boundary between adjacent zones containing the reinforcing elements deviated in phase is axially spaced from a widthwise end of the reinforcing ply by a distance being not more than about 0.25 times as much as the width of the reinforcing layer.

* * * * *